United States Patent
Lugg

(10) Patent No.: US 8,845,290 B1
(45) Date of Patent: Sep. 30, 2014

(54) SYSTEM AND METHOD FOR MAGNETICALLY AND AERODYNAMICALLY OPTIMIZED CONTROL OF ROTORHEAD

(75) Inventor: Richard H. Lugg, Falmouth, ME (US)

(73) Assignee: Sonic Blue Aerospace, Inc., Mebane, NC (US)

( * ) Notice: Subject to any disclaimer, the term of this patent is extended or adjusted under 35 U.S.C. 154(b) by 805 days.

(21) Appl. No.: 12/976,687

(22) Filed: Dec. 22, 2010

Related U.S. Application Data

(60) Provisional application No. 61/289,164, filed on Dec. 22, 2009.

(51) Int. Cl.
*B64C 27/78* (2006.01)

(52) U.S. Cl.
USPC .......................................................... 416/147

(58) Field of Classification Search
CPC ........ B64C 11/30; B64C 11/32; B64C 11/34; B64C 11/36; B64C 11/44; B64C 27/48; B64C 27/78; B64C 27/72
See application file for complete search history.

(56) References Cited

U.S. PATENT DOCUMENTS

2009/0269199 A1* 10/2009 Rudley et al. .................. 416/113
2010/0150719 A1 6/2010 Waide et al.

* cited by examiner

*Primary Examiner* — Edward Look
*Assistant Examiner* — Jeffrey A Brownson
(74) *Attorney, Agent, or Firm* — Caseiro Burke LLC; Chris A. Caseiro

(57) ABSTRACT

A rotorcraft having an operational range and a plurality of rotor blades, each rotor blade capable of assuming an angular pitch, utilizes a control apparatus a mechanism for independently controlling an angular pitch value of each of the plurality of rotor blades wherein a collective sum of the angular pitch values of the plurality of rotor blades is not constant over the operational range of the rotorcraft.

4 Claims, 5 Drawing Sheets

SYSTEM AND METHOD FOR MAGNETICALLY AND AERODYNAMICALLY OPTIMIZED CONTROL OF ROTORHEAD

CROSS REFERENCE TO RELATED APPLICATIONS

This application claims priority to U.S. Provisional Application Ser. No. 61/289,164 filed Dec. 22, 2009, entitled MAGNETIC AERODYNAMIC GENERATION of ROTORHEAD OPTIMIZED CONTROL (MAGROC) which is incorporated herein by this reference in its entirety for all purposes.

FIELD OF THE INVENTION

The invention pertains to rotorcraft, and, more particularly, a flight control system for both manned and unmanned rotorcraft (helicopters) whereby governance of pitch, roll and collective axis are activated with electric and magnetic high density torque fields.

BACKGROUND

There have been numerous investigations on analysis and scaling of electrical machines as it relates to DC synchronus permanent magnet motors and generators, but little to no analysis or criteria for defining architectures and topology of electric magnetic machines known as magnetic gear or magnetic transmission actuators. The analysis of magnetic force and torque density has been addressed by a number of investigators, but very little on high speed actuator or switching transmission machines has been conducted.

There currently does not exist magnetic transmissions that operate at high speed to benefit the efficiency of rotorcraft or helicopter rotorhead actuation, thus offering a different power and propulsion architecture to rotorcraft. A need exists for a technique to segment rotorhead rotorblade aerodynamic control in order to provide a multitude of flight control options and superior flight control, and to an exact electromagnetic 100% positioning control and efficiency from electric magnetic array actuator rotating machinery, which would have broad need for improvement of thermodynamic and aerodynamic efficiencies.

Advances in rotorblade head technology in rotorcraft have been limited by mechanical control designs utilizing linkages and rotating component systems termed swashplates, to deliver the required mechanical forces and provide pitch, roll and collective changes in rotorblades, and then the order of cyclic positioning to provide pitch and roll dependent on rotorblade position within the 360 degree rotation of a rotorcraft rotorhead during powered flight. Yaw inputs to the rotorcraft vehicle control straight line flight via offsetting the counter rotating torque created by the rotating rotorhead through directional thrust changes at the tail rotor, which are typically controlled through mechanical linkages in tail rotor designs, a technical approach more than eighty years old.

SUMMARY OF INVENTION

Disclosed is a flight control systems for both manned and unmanned rotorcraft (helicopters) whereby governance of pitch, roll and collective movements are activated with electric and magnetic high density torque fields, rather than mechanical linkages upon rotorblades through a swashplate device, for a vertical take-off and landing rotorcraft air vehicle (manned helicopter or vertical takeoff and landing unmanned air vehicle, VTOLUAV), whether being a typical helicopter, a tiltrotor, a counter rotating single axial rotorcraft or twin rotor helicopter aircraft.

The system utilizes an electromagnetic segmented rotorhead for rotorcraft, and technique for actuating the rotorblades with high torques density, pseudo-hysteresis controlled, flux gate actuated, electric machine array actuators, disposed in the rotorhead, and thus attached to the rotorblades, enabling each rotorblade to operate in its own specific aerodynamic environment in relation to the others, but synchronized as needed to control the flight path, but capable of being independently segmented to control off design conditions like retreating blade stall.

The disclosed system utilizes a rigid rotorhead without a required flapping mechanism for stability of the rotorcraft vehicle. Instead, stability is provided at a very high rate of precise flight control via the electromagnetic actuation and flight control system due to high rate of control speed input for cyclic, pitch and roll angles of attack, at each rotor blade hub. Lead and lag of the rotor blades are not mechanically held to separate mechanical rotorhead bladeholders, and the lead and lag may be retained instead of large bolt and nut attachments, by the high density magnetic torque field produced by opposing permanent magnets in the rotorblade and direct current induction motors turning magnets attached to a shaft in the rotorhead, within the field of fixed magnets of the rotor blade. The mechanical main rotorhead and tailrotor designs that can be replaced by the disclosed method of the magnetic flight and actuation control system in rotorcraft are very complex in nature, adding to high maintenance costs with large amounts of down time on rotorcraft hence breeding escalated maintenance costs, which typically have driven large operational inefficiencies in rotorcraft fleets whether in commercial or military aviation. Methods of activating flight control using non-mechanical systems offers the advantages of fewer moving parts, lower weight, less complexity of flight control and actuation systems, higher precision inputs to flight control actuation of the rotorblades and rotorhead, and very high aerodynamic efficiencies in hovering maneuvers and in forward flight.

According to one aspect of the disclosure, in a rotorcraft having an operational range and a plurality of rotor blades, each rotor blade capable of assuming an angular pitch, a control apparatus comprises a mechanism for independently controlling an angular pitch value of each of the plurality of rotorblades wherein a collective sum of the angular pitch values of the plurality of rotorblades is not constant over the operational range of the rotorcraft.

According to a second aspect of the disclosure, a method for controlling rotorcraft having an operational range and a plurality of rotor blades, each rotor blade capable of assuming an angular pitch different from the angular pitch of others of the plurality of rotor blades at a given instance of operation, the method comprises controlling the angular pitch of the plurality of rotorblades such that a collective sum of the angular pitch values of the plurality of rotorblades is not constant over the operational range of the rotorcraft.

According to a third aspect of the disclosure, In a rotorcraft having a rotor blade secured to a rotor hub, a control apparatus disposed at comprises: a motor having a rotatable shaft extending therefrom; a shaft permanent magnet array disposed about a free end of the shaft; a stationary array of permanent magnets disposed about the shaft array; a ring disposed intermediate the shaft array and stationary array for selectively passing an electromagnetic field generated by the shaft array to the stationary array; and a rotating stator array disposed about the stationary array.

BRIEF DESCRIPTION OF THE DRAWING

The above and further advantages of the invention may be better understood by referring to the following description in conjunction with the accompanying drawings in which.

DETAILED DESCRIPTION

Figure 4:
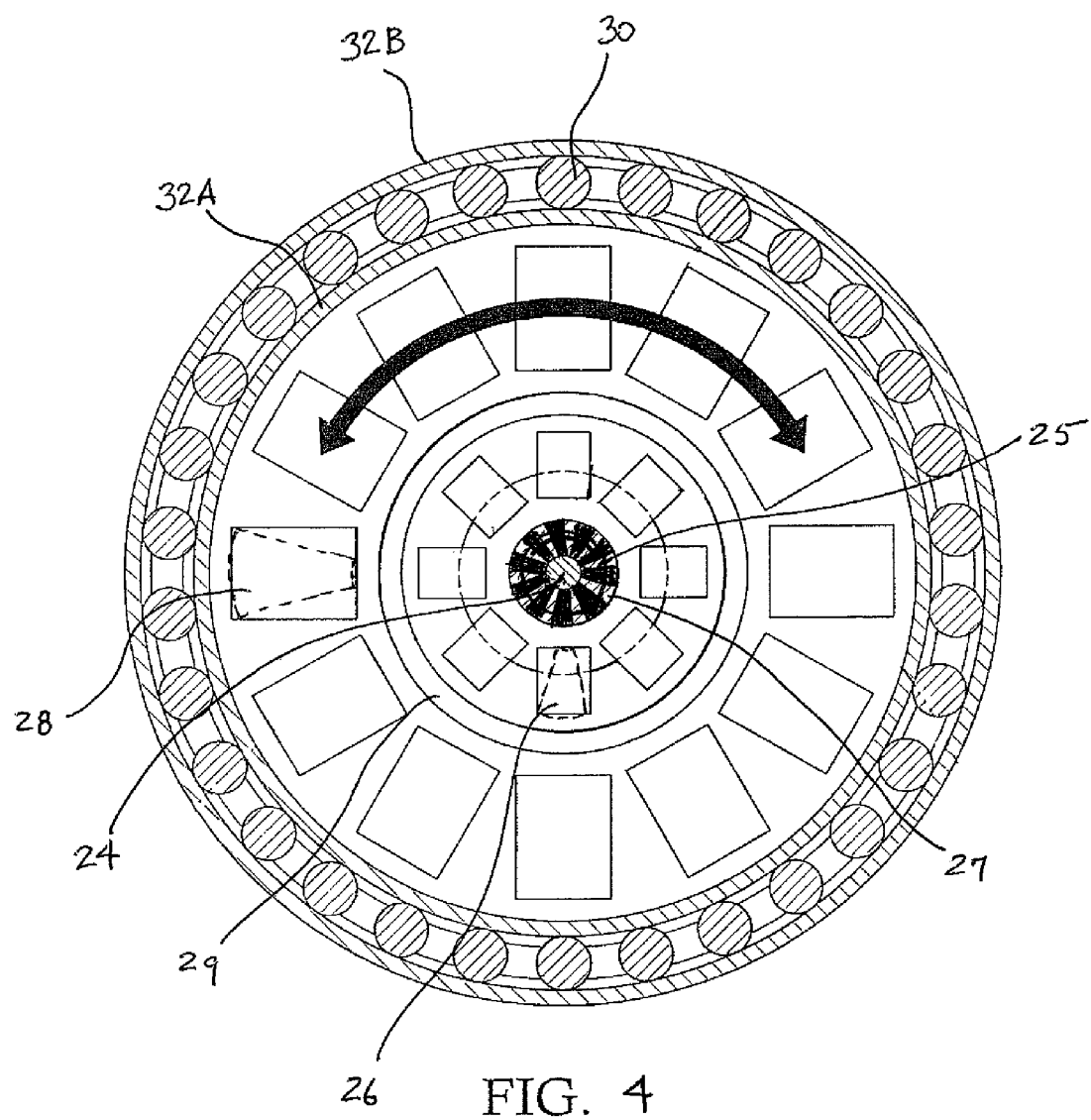
FIG. 4 is a conceptual cross-sectional view of the an electromagnetic blade pitch control mechanism as viewed from line 4-4 of FIG. 3.
Figure 5:
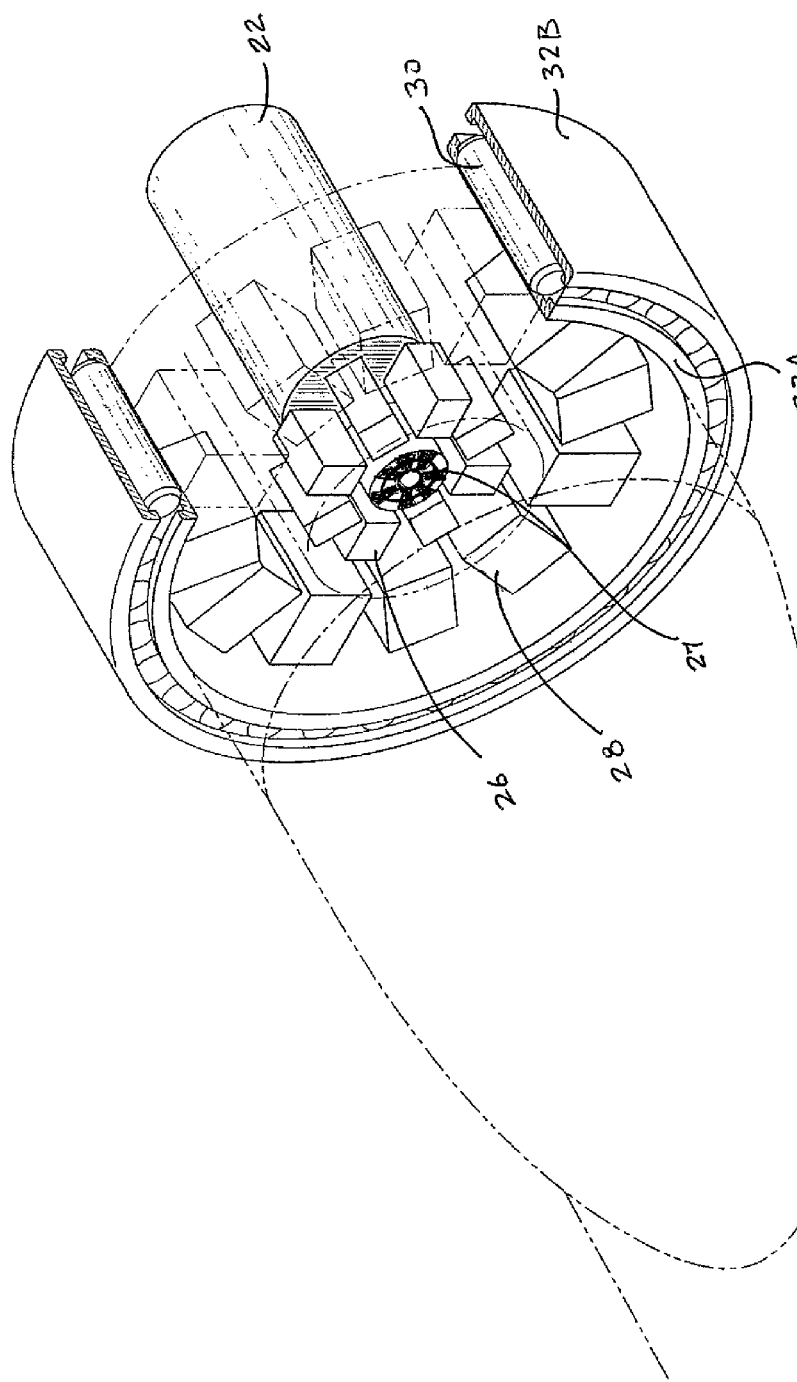
FIG. 5 is a conceptual perspective partially cutaway view of the an electromagnetic blade pitch control mechanism of FIG. 3 illustrating arrangement of its respective components relative to the rotor blade.

Disclosed is a new method of actuation and flight control for all types of rotorcraft (helicopters) whereby cyclic inputs to the blades, and pitch and roll input to the blades are not controlled mechanically but are controlled by a novel and unique electromagnetic actuation and control system 5 referred to hereafter as Magnetic Aerodynamic Generation of Rotorhead Optimized Control (MAGROC). According to one embodiment, a rotorcraft has plural rotor blades 10A-E secured to a rotor head 15. A control apparatus disposed proximate the head (rotor) end of each rotorblade 10 comprises a motor 22 having a rotatable shaft 24 extending with a permanent magnet array 25 disposed about a free end of the shaft 24. A stationary array of permanent magnets 26 is disposed about the shaft array 25. A ring 27 is disposed intermediate the shaft array 25 and stationary array 26 for selectively passing an electromagnetic field generated by the shaft array 25 to the stationary array 26. Ring 27 comprises both ferrous and nonferrous materials spaced along the circumference of the ring 27. In one embodiment, the ferrous portions of ring 27 may be coupled to a DC current source creating electromagnetic. The bottom of ring 27 has plurality of teeth which may be coupled to a stepper motor via a worm gear in a manner understood by those reasonably skilled in the arts. The stepper motor may be controlled by a microprocessor which allows the ring 27 to be rotated through limited angular displacements just enough to position either the ferrous or non-ferrous portion of the ring intermediate stationary array 26 and the shaft array 25. In this manner, ring 27 is used as an electronic switch for selectively controlling the flux strength of the magnetic field between shaft array 25 and stationary array 26. A stator array 28 is disposed within the head end of blade 10 about the stationary array 26 and rotates relative to the blade axis and axis shaft 24 by means of a plurality of cylindrical roller bearings 30 movably retained within roller bearing housings 32A-B. in the illustrative embodiment, the bearings 38 the form of hard stainless steel. The roller bearing housing 32A is secured directly to the perimeter of the head end of blade 10. Blades 10 in the illustrative argument may be formed from a composite material which is electromagnetically transmissive allowing the backpack field generated from array 26 to reach circular array 28 embedded within the blade, as illustrated. The individual permanent magnets comprising each of arrays 26 and 28 may be trapezoidally shaped with straight sides extending between arcuate or curved end surfaces, as illustrated in Phantom in FIG. 4.

Figure 1:
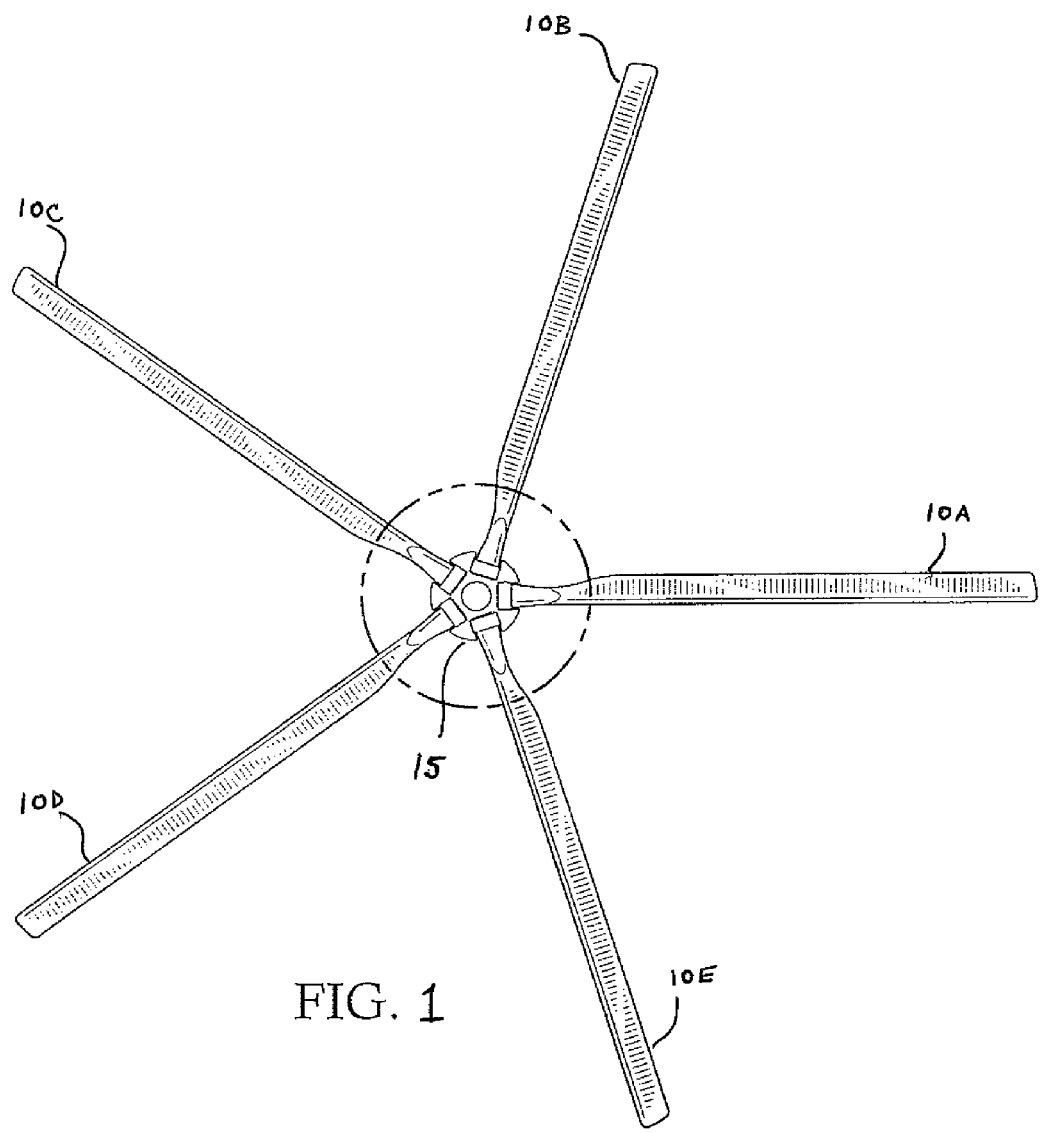
FIG. 1 is a conceptual illustration of a top view of a rotor head in accordance with the disclosure.
Figure 2:
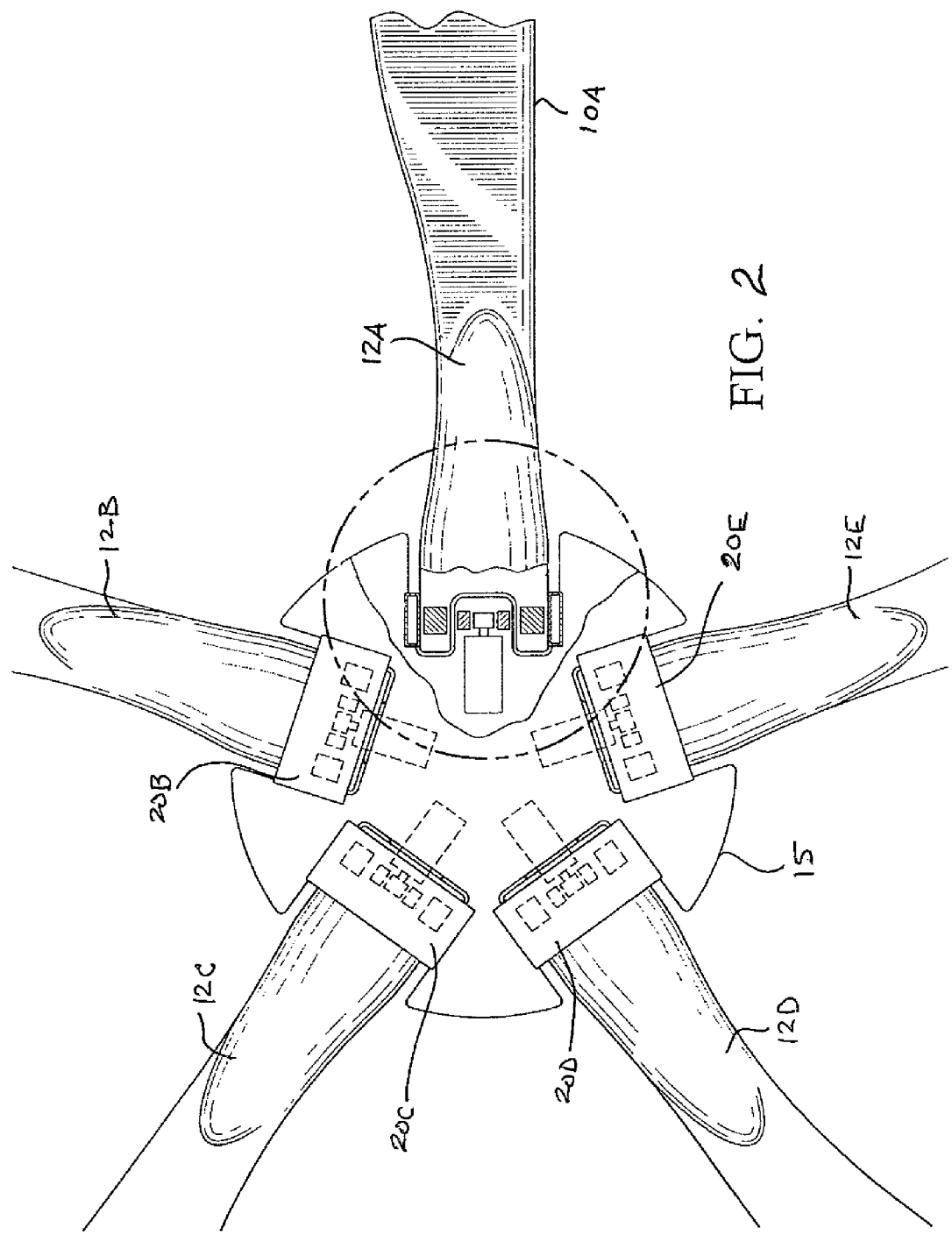
FIG. 2 is an enlarged view of the rotor head configuration of FIG. 1 illustrating a partial cross-section of one of the rotor blades in accordance with the disclosure.
Figure 3:
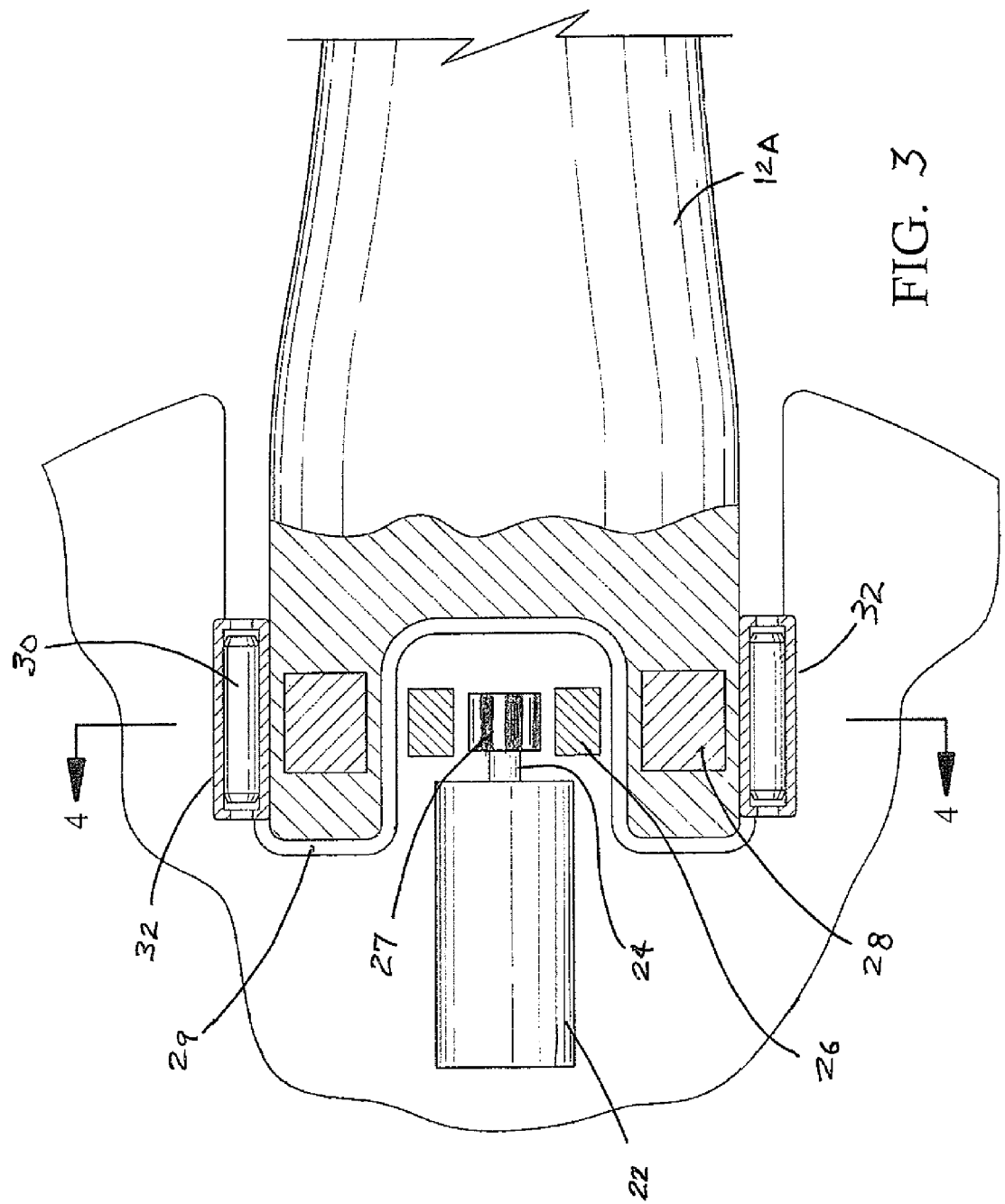
FIG. 3 is an enlarged view of the rotor head configuration of FIG. 2 illustrating a partial cross-section of an electromagnetic blade pitch control mechanism in accordance with the disclosure.

The magnetic control system 5 takes rotor blade inputs from manipulated magnetic fields within the constraint of each rotor blade 10A-E location in the rotor head 15, as are generated by permanent magnet motors 22A-E located in the rotorhead 15 (one PM motor per blade, so for a five blade rotor head there will be five PM motors 22 whose shafts 24 are attached to a permanent magnet array 25 on the shaft end), which as directed by sensored control inputs for correct flight path of the rotorcraft, forward flight, directional controlled flight and vertical ascent and descent gain is achieved. In the location of each PM motor 22 in the five blade rotorhead, for example, its shaft where PMs are attached, lie in plane to each rotorblade 10, inserted to a specific rotorhead receptacle for each blade is illustrated in FIG. 2-3. Each rotor blade 10 receives a set of permanent magnets (one lying in parallel to the leading edge root and one lying in parallel to the trailing edge root of each rotorcraft rotorhead) which align in close proximity to the rotating PMs on the shaft of the PM motor 22 in the rotorblade head end, as illustrated. The PM motor 22 with the PM array 25 on its shaft is electrified from an on board power generation source (embedded generator in a gas turbine or superconducting electromagnetic storage device or hybrid fuel cell generation and storage device, for example) and has a microprocessor controller which controls shaft speed and direction, whereby these directional change velocities create a high density magnetic torque field which controls direction of pitch of each rotor blade 10 inserted in the rotorblade receptacle in the rotorhead 15, as it rotates with the other rotor blades through the 360 degree arc of rotorblade rotation needed for lift and directional control for any rotorcraft vehicle platform. The angle of pitch of any given rotor blade 10 to achieve controlled flight is governed by software flight control processors and central computing in the case of an unmanned rotorcraft, or pilot control inputs, where the correct pitch angle is achieved electromagnetically and without the need for swash plates required to connect mechanical linkages to the rotorblade heads. In the illustrative embodiment having 5 rotor blades 10 cup to rotor head 15, the magnetic fields are proportional directly to the amount of pitch angle required in any one-fifth of the 360 degree quadrant as the rotor head 15 rotates from the power of the rotorcraft engine. The MAGROC system 5 gives absolute precise control beyond anything achievable with hydraulically driven mechanical linkages, and additionally offers a greater margin of safety.

Rigid rotor head 15 comprises a plurality of blades (2, 3, 4 . . . N—number of blades) whereby the cyclic inputs to the blades (vertical ascent and vertical descent) as well as pitch and roll input, to the blades, are not controlled mechanically but are controlled by a novel and unique electromagnetic actuation and control system 5, within a generated electromagnetic field from rotating permanent magnets on a PM motor shaft 24 in the rotor hub and fixed field magnets 26 in the blades 10. The magnetic control system 5 takes rotorblade inputs from manipulated magnetic fields within the constraint of each rotor blade location in the rotorhead, which are generated by permanent magnet motors located in the rotorhead (one PM motor per blade, so for a five blade rotor head there will be five PM motors whose shafts are attached to a permanent magnet array on the shaft), which as directed by sensored control inputs for correct flight path of the rotorcraft, flight control response for cyclic and vertical ascent and descent is obtained.

Semi-rigid multi-blade electromagnetic actuation and control system for the invention has a flapping hinge point aft of the PM motor 22 in what may be described as a rotorblade holder, which generates the controlled magnetic field to the rotorblade. In an alternative embodiment in the rotorblade holder as a rigid rotorhead, whereby there is no flapping mechanism, and each blade is held in compliance in the vertical plane by the magnetic fields, with assistance (dependent on the mission loading) from mechanical thrust bearings.

In another alternative embodiment, a lead and lag mechanism may be included for each rotor blade as a method to change the incidence angle of the blade to the oncoming airstream which is typical of control technologies in present in rotorcraft flight control technologies in current art. Alternatively, in another embodiment in aerodynamic control, with the removal of the flapping hinge mechanism, the positioning of the PMs, and in relation to the rotating shafts, lead and lag requirements of the rotating rotor blades may be accomplished by generation of active electromagnetic fields functioning in the lead lag horizontal plane, about the neutral pitch axis, to accommodate retreating blade stall, or the removal of it, and improve high speed forward flight by electromagnetically precisely positioning, at any point along the 360 rotating arc, any one of multiple blades, to optimize and maximize lift/drag coefficients and Reynolds numbers of all the rotating blades, at the precise positioning in time, with each blades respective rotation as attached to the respective position of the electromagnetic rotorhead.

Utilizing system 5, no flapping mechanism is required for stability of the rotorcraft vehicle as this is provided at a very high rate of precise flight control via the electromagnetic actuation and flight control system due to high rate of control speed input for cyclic, pitch and roll angles of attack, at each rotor blade hub. Lead and lag of the rotor blades are not mechanically held to separate mechanical rotorhead bladeholders, and the lead and lag may be retained instead of large bolt and nut attachments, by the high density magnetic torque field produced by opposing permanent magnets in the rotorblade and direct current induction motors turning magnets attached to a shaft in the rotorhead, within the field of fixed magnets of the rotor blade. Advances in rotorblade head technology in rotorcraft have been limited by mechanical control designs utilizing linkages and rotating component systems termed swashplates, to deliver the required mechanical forces and provide pitch and roll changes in rotorblades, and then the order of cyclic positioning to provide pitch and roll dependent on rotorblade position within the 360 degree rotation of a rotorcraft rotorhead during powered flight. Yaw inputs to the rotorcraft vehicle control straight line flight via offsetting the counter rotating torque created by the rotating rotorhead through directional thrust changes at the tail rotor, which are typically controlled through mechanical linkages in tail rotor designs, a technical approach more than eighty years old. The mechanical main rotorhead and tailrotor designs that can be replaced by the invention method of the magnetic flight and actuation control system in rotorcraft are very complex in nature, adding to high maintenance costs with large amounts of down time on rotorcraft hence breeding escalated maintenance costs, which typically have driven large operational inefficiencies in rotorcraft fleets whether in commercial or military aviation. The disclosed method of activating flight control using non-mechanical systems offers advantages as in fewer moving parts, lower weight and complexity of flight control and actuation systems, higher precision inputs to flight control actuation of the rotorblades and rotorhead, and additionally very high aerodynamic efficiencies in hovering maneuvers and in forward flight.

As used herein, the term "pitch angle" or "angular pitch value" relative to a rotor blade means the angle relative to the mean chord of the rotor blade, as measured from the leading edge to the trailing edge of the rotor blade. In traditional rotorcraft which utilized swashplate, the collective sum of all pitch angles of all rotor blades is constant and any instance of operation, due to the linkage interdependencies of the blades relative to the swashplate. Conversely, utilizing the control system disclosed herein, not only may the pitch angle of each respective rotorblade be independent of the other rotorblades, their collective sums does not need to be constant given the absence of a swashplate, and, therefore, the elimination of the interdependency between rotorblades. Disclosed herein is a rotorcraft capable of operating without swashplate for its operational range. Accordingly, all the limitations associated with a swashplate and mechanical linkages are no longer present, allowing blade pitch angles to be optimized pitch and roll of the rotorcraft.

Having described herein illustrative embodiments of the disclose concept, persons of ordinary skill in the art will appreciate various other features and advantages thereof apart from those specifically described above. It should therefore be understood that the foregoing is only illustrative of the disclose principles, and that various modifications and additions can be made by those skilled in the art without departing from the spirit and scope of the invention. Accordingly, the appended claims shall not be limited by the particular features which have been shown and described, but shall be construed also to cover any obvious modifications and equivalents thereof.

What is claimed is:

1. In a rotorcraft having an operational range and a plurality of rotor blades, each rotor blade capable of assuming an angular pitch, a control apparatus comprising:
   a mechanism for independently controlling an angular pitch value of each of the plurality of rotor blades;
   wherein a collective sum of the angular pitch values of the plurality of rotor blades is not constant over the operational range of the rotorcraft.

2. In a rotorcraft having a rotor blade secured to a rotor hub, a control apparatus disposed at a rotor end of the rotor blade, the control apparatus comprising:
   a motor having a rotatable shaft extending therefrom;
   a shaft array of permanent magnets disposed about a free end of the rotatable shaft;
   a stationary array of permanent magnets disposed about the shaft array;
   a ring disposed intermediate the shaft array and the stationary array for selectively passing an electromagnetic field generated by the shaft array to the stationary array; and
   a rotating stator array disposed about the stationary array.

3. The rotorcraft of claim 2 without a swashplate.

4. The rotorcraft of claim 2 without direct or indirect mechanical linkages between rotor blades.

* * * * *